(12) United States Patent
Van Drie

(10) Patent No.: US 8,357,293 B1
(45) Date of Patent: Jan. 22, 2013

(54) BIOLOGICAL WASTE DIGESTER

(76) Inventor: Gerhardt Van Drie, El Segundo, CA (US)

( * ) Notice: Subject to any disclaimer, the term of this patent is extended or adjusted under 35 U.S.C. 154(b) by 0 days.

(21) Appl. No.: 13/441,670

(22) Filed: Apr. 6, 2012

Related U.S. Application Data

(60) Provisional application No. 61/572,083, filed on Jul. 11, 2011.

(51) Int. Cl.
*B01D 33/00* (2006.01)
(52) U.S. Cl. ......... 210/121; 210/122; 210/150; 366/335
(58) Field of Classification Search .......... 210/150–151, 210/121–122; 366/335
See application file for complete search history.

(56) References Cited

U.S. PATENT DOCUMENTS 7,083,324 B2 * 8/2006 Van Drie ............... 366/335

* cited by examiner

*Primary Examiner* — Chester Barry
(74) *Attorney, Agent, or Firm* — Gene Scott; Patent Law & Venture Group

(57) ABSTRACT

An aerobic bacteria waste digester uses a rocking paddle to mix a waste fluid. A pair of spaced-apart inflatables engaged with the paddle and alternately inflated provide buoyancy forces to drive the rocking action. The paddle has two decks and a peripheral skirt. The paddle is of a trestle-type construction with light weight planks forming the decks. The position and motion of paddle surfaces and air bubbled through the fluid from below, is able to enhance bacteria colony growth and thus the rate of bio-mass digestion.

9 Claims, 6 Drawing Sheets

US 8,357,293 B1

BIOLOGICAL WASTE DIGESTER

This application claims date priority of provisional patent application 61/572,083 filed on Jul. 11, 2011 and which is co-pending and incorporates the same subject matter as this application, 61/572,083 and also U.S. Pat. No. 8,133,386 issued on Mar. 13, 2012 and is hereby incorporated by reference herein in their entirety: said application.

BACKGROUND

The present disclosure relates to the field of large-scale water treatment, and more particularly to the treatment of aqueous borne waste from municipal, commercial and industrial operations; but is not limited thereto. In patents: U.S. Pat. No. 5,762,418, U.S. Pat. No. 6,029,955, U.S. Pat. No. 6,036,357, U.S. Pat. No. 6,322,056, U.S. Pat. No. 6,554,259, U.S. Pat. No. 6,599,426, U.S. Pat. No. 6,926,437, and U.S. Pat. No. 7,083,324, the present inventor defines apparatus and methods for treating sludge and other materials. The present invention extends this body of knowledge and particularly utilizes the combination of gravity and buoyancy and automated inflation to buoyant elements to assist in mixing for improved efficiency in aerobic bacteria growth in waste digesters.

BRIEF SUMMARY

It is well known that potable water is essential to healthy living and that in many parts of the world today primary water sources tend to be contaminated by waste waters from domestic effluents, and commercial and industrial operations. It is believed that a large percentage of hospitalizations in emerging countries is due to the human consumption of contaminated water. The present disclosure relates to the treatment of aqueous effluents, especially domestic sewage, using the forces of buoyancy and gravity in digester tanks. These processes use bacteria to consume effluent's organic waste products and require aggressive mixing for effective results. By using the aforementioned forces relatively little additional energy is required and therefore solar-electrical power becomes a viable alternative for such operations especially in areas where utility-electric power is expensive or absent. Aerobic bacteria are able to obtain the oxygen they need for the digestion processes directly from the aqueous effluent. To operate a practical process the effluent is oxygenated by bubbling oxygen gas or air through the fluid. These gases may be introduced into solution using porous diffusers located at the bottom of the digester tank. Mixing allows more time for oxygen to enter solution and keeps the bacteria, the organic matter and the oxygen evenly distributed throughout the tank.

The present disclosure defines an apparatus and its method of use for digesting an organic sludge as an aqueous mixture within a biological digester tank. Mixing of the aqueous mixture is induced by the action of a rocking paddle using the buoyancy force of inflatable sacks such as tire inner tubes in order to produce a cyclic up and down motion of the paddle within the tank. The digesting process uses aerobic bacteria and is accelerated by oxygenation of the organic sludge by injecting an oxygen bearing gas into the digester tank in the form of bubbles which rise from the bottom of the digester tank through the aqueous mixture.

In one aspect of the apparatus, the rocking paddle is mounted on a supporting beam so that it is free to move in a see-saw type motion within the aqueous mixture, wherein one end of the paddle moves lower within the aqueous mixture while the other end moves higher and then motion of the ends of the rocking paddle reverse in a continuing cycle.

In another aspect of the apparatus, the inflatable sacks are fixedly secured to the paddle so that by alternate inflations they are able to alternately raise first one end and then the opposing end of the rocking paddle by their buoyancy force.

In another aspect of the method, an air supply is used to alternately and simultaneously inflate one of the inflatable sacks while deflating the other in a continuously reversing process. The air bleed from one of the inflatable sacks, while it is deflating, is used to inflate the other one of the inflatable sacks and vice-versa thereby reducing the energy required for the inflations.

In another aspect of the apparatus, alternately each opposing end of the rocking paddle moves downwardly or falls through the aqueous mixture due to the force of gravity when its inflatable sack is deflated. Since the rocking paddle is a rigid body when one end moves upwardly the opposing end must move downwardly.

In another aspect of the apparatus the rocking paddle presents a plurality of surfaces which are oriented to force the rising gas bubbles to move in a lateral motion thereby extending their contact time with the aqueous mixture which improves oxygen absorption and the rate of growth of the bacteria resulting in an improved rate of digestion.

These and other aspects may, in various implementations, provide advantages such as: a relatively small capital investment, low operating and maintenance costs, fully automated operation, and high throughput for a given tank size. The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawings indicate like elements.

DETAILED DESCRIPTION

A digester such as the subject apparatus 10 described herein is used for processing an organic aqueous sludge with aerobic bacteria, together referred to herein by the term "mixture 20." The process occurs within a digester tank 30. Air or oxygen gas may be introduced at the bottom of tank 30 so that bubbles of the gas rise though the mixture 20 thereby supporting growth of colonies of the aerobic bacteria to enhance the rate of the digestion process. This is clearly shown and described in the incorporated references.

Figure 1:
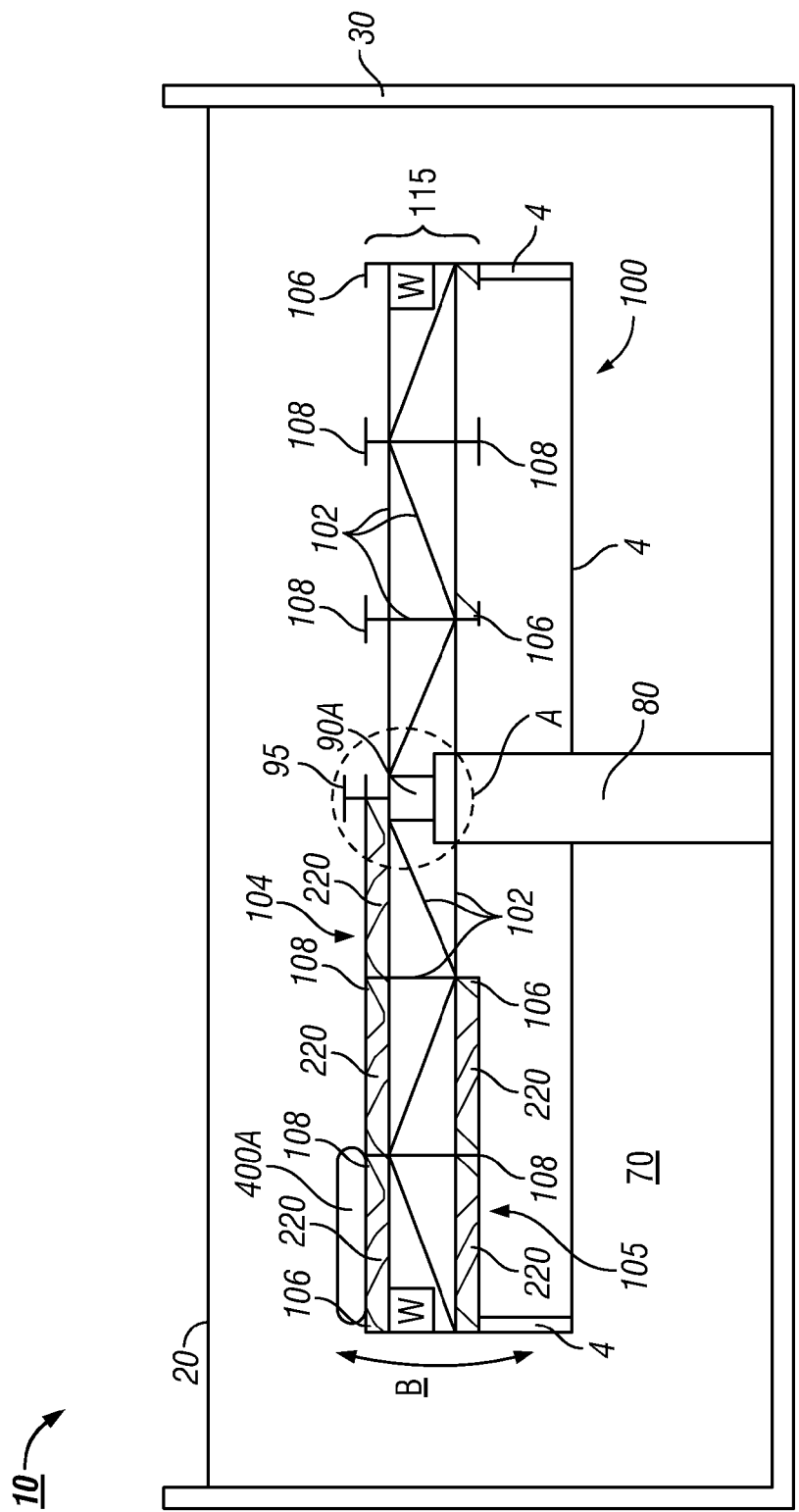
FIG. 1 is an example schematic diagram showing a side-elevational view of a mixing tank.

FIG. 1 shows the apparatus 10 which includes a paddle 100, which may be rotatably mounted within tank 30 in any one of several ways including the embodiments described herein but is not limited thereto.

Figure 3:
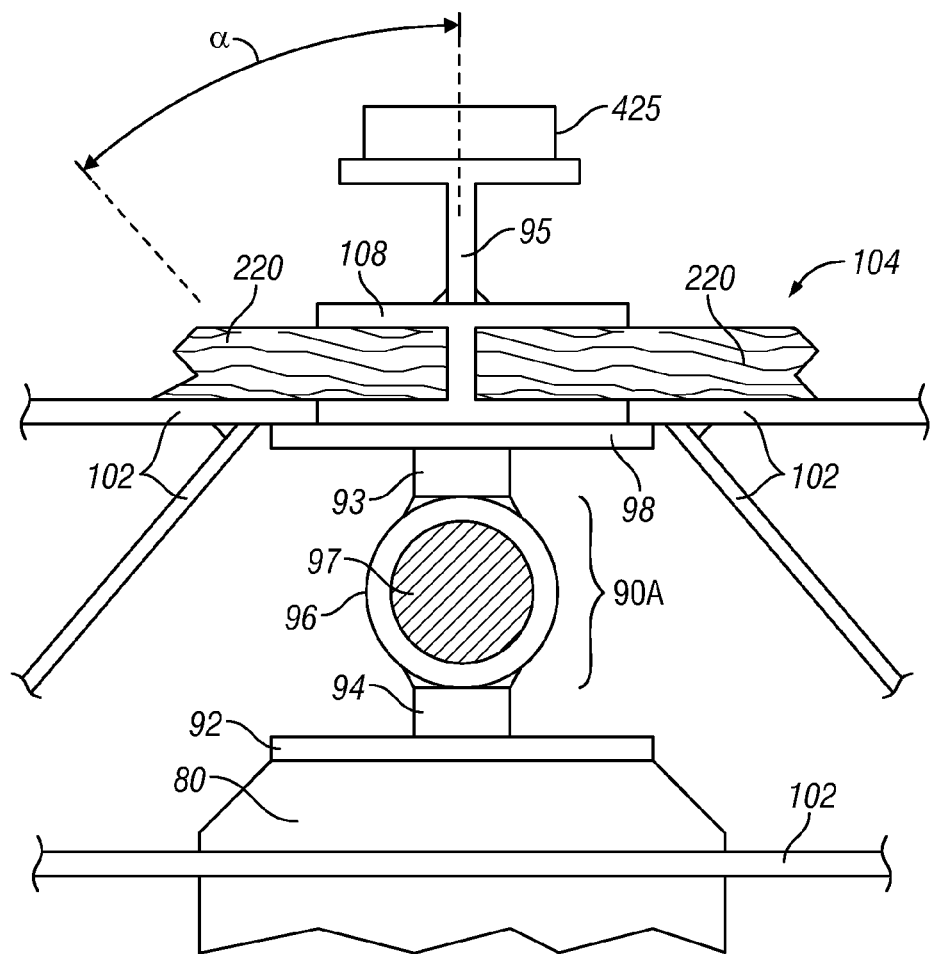
FIG. 3 is an example partial view thereof taken at sectional line A in FIG. 1.

Paddle 100 may be a rigid, elongated metal structure 115 including C-frames 106, I-frames 108 and interconnecting struts 102 as shown in FIG. 1. These elements may be arranged and joined by welding or otherwise to receive planks 220 which may be made of wood or other relatively lightweight material. FIG. 3 shows typical planks 220 secured by portions of an I-frame 108. At the right side of FIG. 1, the metal structure 115 is shown without planks 220 so as to provide a better understanding of how the structure 115 may be made up. At the left side of FIG. 1, the metal structure 115 is shown with planks 220 inserted into the structure 115 as exemplified by FIG. 3. The paddle 100 may be made up of the elements shown or may be constructed in an alternate manner as would be known by those of skill in the art. However, an open frame, trestle-like, structure with light weight planks is a superior and highly novel approach providing cost saving and light weight. It should be clear that struts 102 may be made up of L-iron, C-iron, square or triangular tubing, or other structural shapes. Structural engineers will be able to calculate the stresses developed within metal structure 115 and will be able to provide appropriate size, shape, strength, and configuration of the struts 102 in order to achieve a stable and rigid paddle 100. Many such configurations of the elements and of the overall configuration of structure 115 may be suitable for the intended use described herein.

Figure 2:
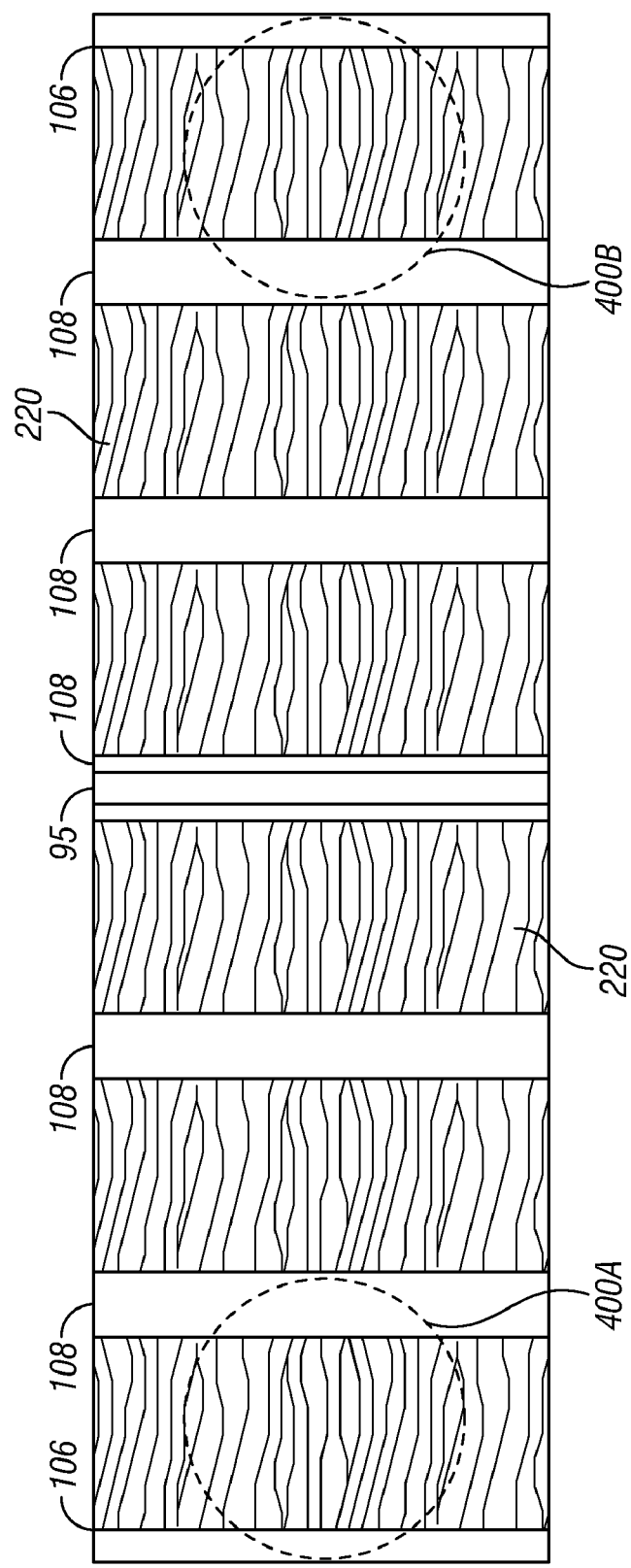
FIG. 2 is an example top plan view of an upper deck of a paddle thereof.

Paddle 100 may include an upper deck 104 which is shown in FIG. 2 in plan view, and a lower deck 105. Upper deck 104 is continuous from end to end as shown in FIG. 2, while lower deck 105 is medially discontinuous in order to provide clearance for gas bubbles to enter between upper 104 and lower 105 decks providing certain advantages as described below. The application of two decks, an upper continuous deck 104 and a lower discontinuous deck 105 which is positioned below the upper deck 104 in the manner shown in FIG. 1 is considered to be an important novelty of the present apparatus as will be recognized in the following description of operation. Weights W may be attached at any position on paddle 100 and generally with equal weights on both the left and right sides of paddle 100. An additional structural element 95 is shown in FIG. 3 and may be used for mounting an attitude or tilt switch 425 as shown.

Paddle 100 is rotationally mounted so as to be able to rock back-and-forth to providing mixing action within mixture 20 as previously described. One or more piers 80, may be used to support paddle 100 and its means for rocking as generally shown in FIG. 1. In one embodiment piers are secured to the bottom of tank 30.

FIG. 3 shows details of an embodiment of the mounting of paddle 100. Lower plate 92 is mounted to pier 80 and upper plate 98 is mounted to the upper deck 104 of paddle 100. Between plates 92 and 98 are positioned bearing 90A which abuts a lower spacer 94, and an upper spacer 93. Bearing 90A may be made up of side-by-side, axially aligned, steel pipe pieces with every other one of the pipe pieces welded to spacer 94, and 93 respectively. Upper plate 98 is therefore able to rotate about hinge pin 97 both CW and CCW. The spacers 93 and 94 prevent a collision between upper and lower plates 98 and 92 for large rotational angles during rocking action. This hinge structure may be mounted on each of the piers 80 used for supporting paddle 100, said piers 80 being spaced laterally across paddle 100.

Figure 4:
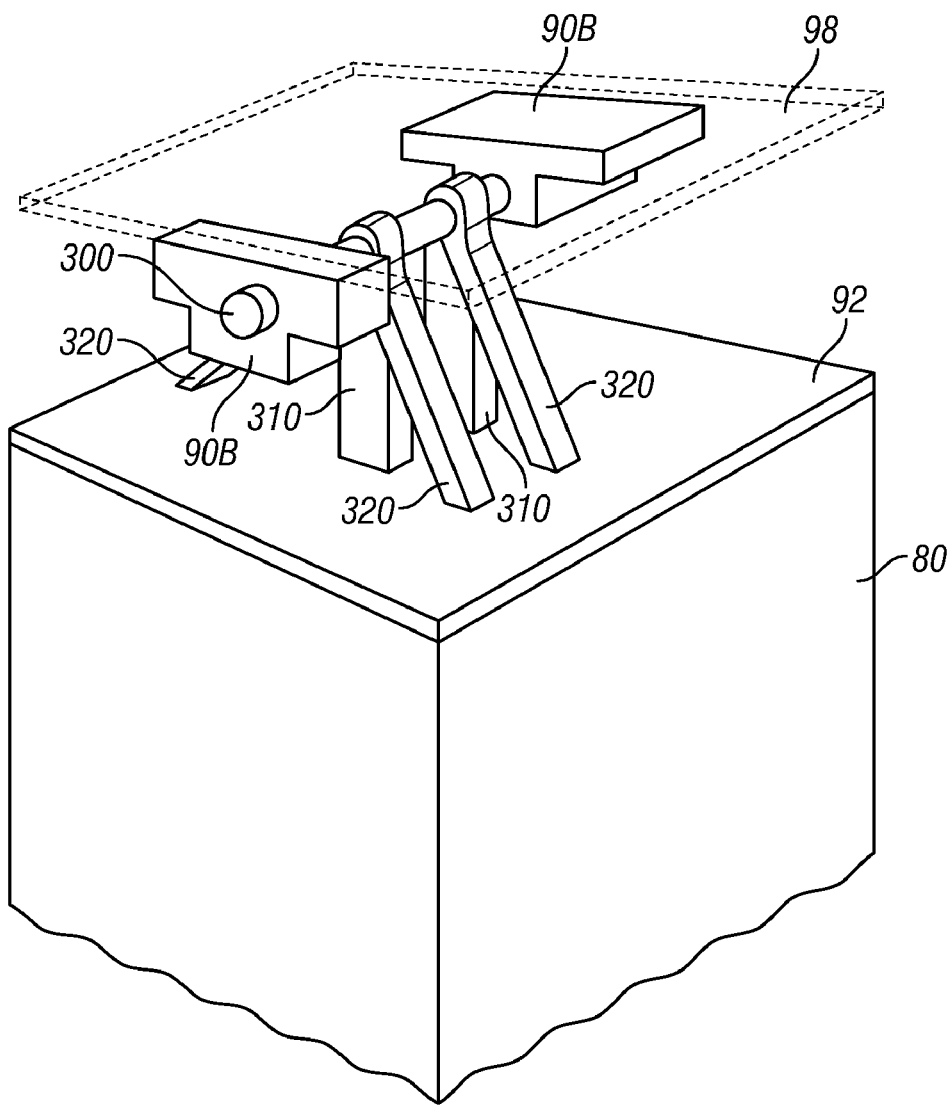
FIG. 4 is an example perspective view of an alternate mounting and support arrangement of the paddle shown in FIG. 2.

FIG. 4 shows details of an alternate embodiment of the mounting of paddle 100. Here, rigid, stationary, structural shaft 300 may be fixedly secured to vertical supports 310 reinforced by struts 320 which are positioned at angles to achieve leverage. The shaft 300 may have second bearings 90B mounted thereon which engage upper plate 98. Elements 310 and 320 are fixed to lower plate 92. Therefore, upper plate 98 is able to rock while lower plate remains motionless secured to a pier 80. In FIG. 4, upper plate 98 is shown by phantom line in order to better view details below.

Figure 5:
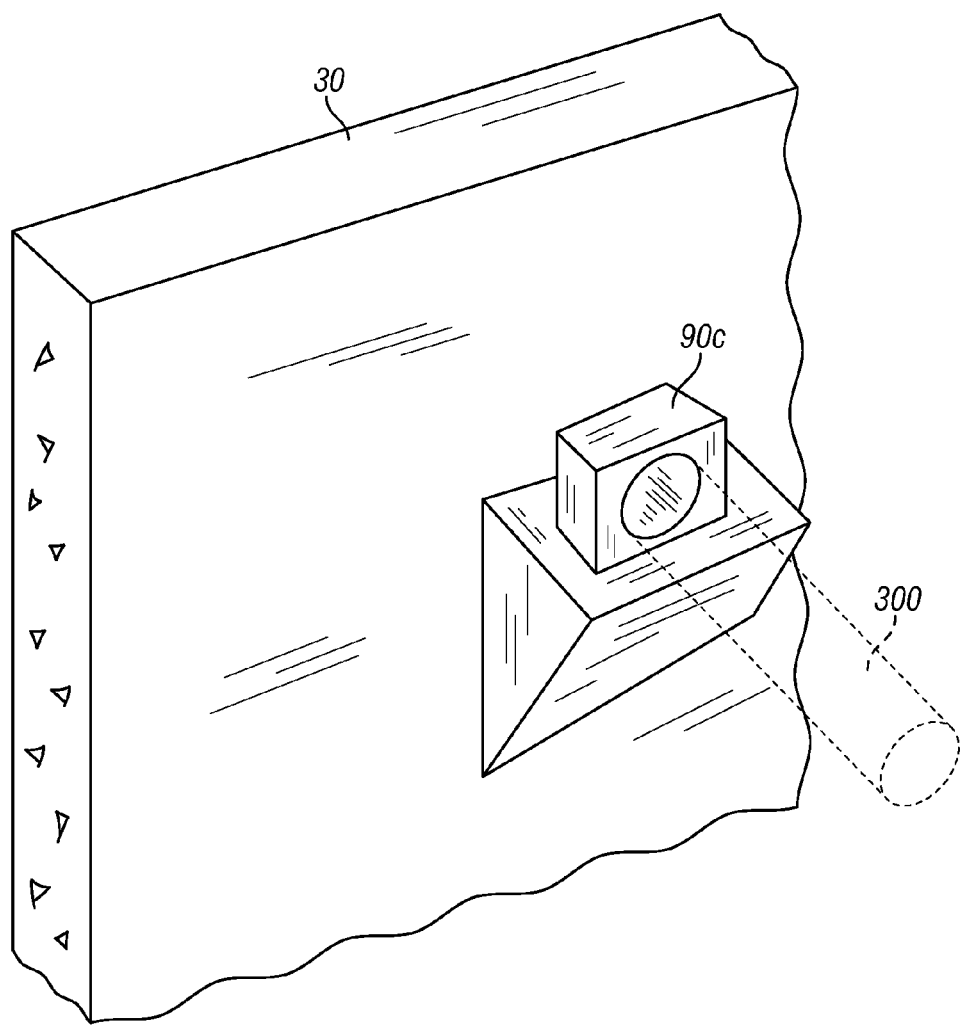
FIG. 5 is an example perspective view of a further alternate mounting supported on a side wall of the mixing tank.

FIG. 5 shows details of a further alternate embodiment that may be used for mounting paddle 100. Here, wall mounted bearings 90C may be split babbitted journal bearings or may be other types of bearings. In this approach, paddle 100 will be secured rigidly to shaft 300 with both paddle and shaft able to rotate together. Paddle 100 is not shown in FIG. 5 but may be mounted atop shaft 300. In this arrangement, no piers 80 or other mountings on the floor of tank 30 are required.

Clearly, other types of mounting arrangements may be conceived by those of skill in the art for mounting paddle 100 within tank 30 so that it is able to rock back and forth while it is able to maintain its longitudinal orientation within tank 30.

Arrow "B" in FIG. 1 indicates motion wherein, as discussed, paddle 100 moves with rocking motion in order to agitate and mix mixture 20, and especially to assure maximal mutual contact between the sludge and the aerobic bacteria of mixture 20 for improving the speed of the digestion process. Oxygen laden gas bubbles move upward within the tank as disbursed from below and come into contact with paddle 100. As an example, when the left side of paddle 100 is tilting downwardly by an angle alpha as exemplified in FIG. 3, gas bubbles rising up through mixture 20 on the left side of the tank 30 are forced by lower deck 105 to move toward the center of paddle 100 and generally will move into the medial open space of lower deck 105. Meanwhile, gas bubbles rising up on the right side of paddle 100 will be forced to move at an angle since they are restricted by the right side of the lower deck 105 and will follow the its surface which is tilted upwardly. Taking this angular path causes the gas bubbles to move through the mixture for a longer time and to therefore come into contact with a much larger number of aerobic bacteria. This results in accelerated growth of such bacteria colonies. Also, when the bubbles move into the space between upper and lower decks they are forced to move angularly also by the under surface of the upper deck 104. The gas bubbles move along the surfaces of both decks 104 and 105 at the same time causing significant quantities of the bacteria to be contacted.

As shown in FIG. 1, skirts 4 may run along the ends and sides of paddle 100 and tend to herd the rising bubbles under paddle 100. All of the above herding and directing of the bubbles results in a significant improvement in oxygenation within the mixture resulting in improved growth of the bacteria colonies that provide digestion of bio-products within the mixture.

The means for rocking paddle 100, as disclosed in the referenced documents are inflatables such as bladders 400A and 400B, inner tubes, air bags and similar items. Bladders 400A and 400B may be fixed to the upper surface of paddle 100 in any practical way at opposite ends thereof as shown by the example dashed lines in FIG. 2. A typical placement of one such bladder 400A is shown in FIG. 1 at the left end of paddle 100. Each said bladder, when inflated, provides buoyancy to one end of paddle 100. By inflating and deflating the bladders in an alternating sequence, the paddle 100 may be caused to tilt downwardly on one side and then followed by the opposing side in a continuous rocking motion.

Figure 6:
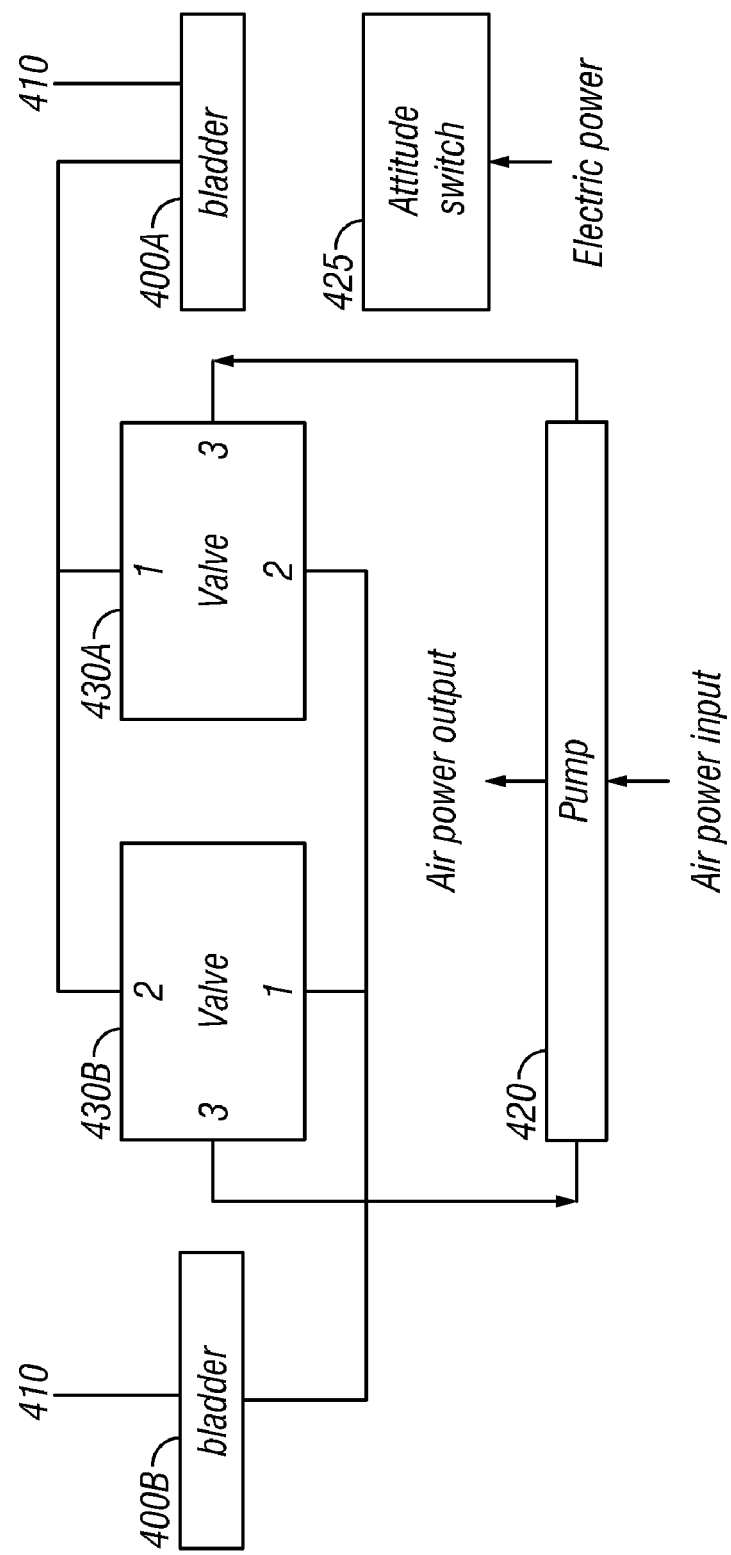
FIG. 6 is an example block diagram of an inflation system of the apparatus.

In FIG. 6 inflatable bladders 400A and 400B may be inflated and deflated manually through Schrader valves 410.

During normal operation the bladders alternate between an inflated state and a deflated state with the gas within one of the bladders delivered to the other of the bladders and then from the other of the bladders back to the one of the bladders during each cycle of the paddle 100. The solid lines in FIG. 6 represents gas lines or conduits. Attitude sensing tilt switch 425, which, as said and shown in FIG. 3, may be mounted medially on paddle 100 at position 95 is able to sense (determine) when paddle 100 tilts to the left and to the right. The attitude switch 425 provides an electrical signal (dashed lines) to valves 430A and 430B which may be, for instance, Snap-Tite 32258-3NB-AR11 solenoid valves. When a bladder is in an extreme downward position, maximum tilt of paddle 100, air in the other bladder is immediately transferred into the low bladder causing it to achieve a significant buoyancy, raising the low bladder and lowering the high, now deflated, bladder. When the reversal is complete, the air is transferred back to the first bladder and the process repeats.

The bladders 400A and 400B are located on the paddle 100 as described. The attitude switch 425 is located centrally on paddle 100, and the pump 420 and valves 430A and 430B are typically located to one side of paddle 100 on the ground adjacent to tank 30. Pump 420 may be an air-pressure driven dual diaphragm pump such as a Price Pump model AOD1 which is driven by a source of air pressure, and is able to continuously provide air pressure at one of its ports and suction at a second one of its ports. Valves 430A and 430B are dual action, dual path type valves and are electrically operated so that port 1 of both valves are open at the same time, or alternately, port 2 of both valves are open at the same time. Ports 1 and ports 2 are not open and are not closed at the same time. Ports 3 are always open so that air flows between either ports 1 and 3 or ports 2 and 3.

For instance, now referring to the system shown in FIG. 6, and assuming bladder 400B is inflated and has reached its highest point within mixture 20, that is, the buoyant force of bladder 400B has raised the left side of paddle 100 (FIG. 1) to its highest point. At that time attitude switch 425, being adjusted to sense this position of paddle 100, electrically switches valves 430A and 430B to open their ports 1 and close ports 2 respectively, so that air in bladder 400B is now sucked by pump 420 through ports 1 and 3 of valve 430B, through pump 420 and then through ports 3 and 1 of valve 430A and into bladder 400A. With bladder 400B deflated and bladder 400A inflated, bladder 400B being at its lowest point within mixture 20, paddle 100 is caused to rise on its right side by the buoyancy force of bladder 400A. When bladder 400A reaches its highest point, i.e., the right side of paddle 100 fully raised, switch 425 closes ports 1 and opens ports 2 of valves 430A and 430B. Air in bladder 400A is then suctioned from bladder 400A, through ports 2 and 3 of valve 430B and through pump 420 and then forced by pumping pressure through ports 3 and 2 of valve 430A and into bladder 400B which at this time is at its lowest point within mixture 20. The buoyant force of bladder 400A causes paddle 100 to reverse positions so that bladder 400B moves to its highest point and this completes the cycle of paddle motion for mixing mixture 20 said paddle motion repeating this cycle on a continuous basis.

A number of embodiments have been described herein. Nevertheless, it will be understood that various modifications may be made without departing from the spirit and scope of this disclosure. Accordingly, other embodiments are within the scope of the following claims.

What is claimed is:

1. An apparatus comprising:
    a paddle enabled for changing positions thereof within a fluid;
    an attitude sensor engaged with the paddle and enabled for sensing the changing positions of the paddle;
    a pair of spaced-apart inflatables engaged with the paddle, the inflatables each providing a buoyant force on the paddle when inflated; and
    an air transfer system enabled to exchange air between the inflatables cyclically as controlled by the attitude sensor.

2. The apparatus of claim 1 wherein the air transfer system has a continuously operating pump interconnected for air flow with a pair of dual state valves, the valves interconnected for air flow with the inflatables and the pump, and electrically interconnected with the attitude sensor, wherein the valves are electrically interconnected to change state simultaneously according to tilt positions of the attitude sensor to thereby draw air from one of the inflatables and deliver said air into the other of the inflatables.

3. The apparatus of claim 1 wherein the fluid is a mixture of a sludge and a sludge digesting factor.

4. The apparatus of claim 1 wherein the attitude sensor is a tilt switch.

5. The apparatus of claim 1 wherein the inflatables are bladders.

6. The apparatus of claim 1 wherein the paddle is mounted within a digester tank and supported for rotation by one of: a hinge and a fixed bar supported within bearings.

7. An apparatus comprising:
    a paddle enabled for changing positions thereof within a fluid;
    an attitude sensor enabled for sensing the positions of the paddle;
    a pair of spaced-apart inflatables engaged with the paddle, the inflatables providing buoyancy forces when inflated;
    an inflation system enabled for exchanging air between the inflatables based upon signals from the attitude sensor; and
    wherein the paddle has an upper deck and a lower deck, an open space medially positioned in the lower deck.

8. The apparatus of claim 7 wherein the paddle has a peripheral skirt.

9. The apparatus of claim 7 wherein the paddle is of a trestle construction with light weight planks engaged therewith forming the upper and lower decks and with weights engaged therewith, the weights of a magnitude and in a placement whereby paddle balance is achieved.

* * * * *